United States Patent
Kumar

(10) Patent No.: US 12,222,900 B1
(45) Date of Patent: Feb. 11, 2025

(54) USER AWARE DATA DELETION JOB

(71) Applicant: Dell Products L.P., Round Rock, TX (US)

(72) Inventor: Shiv S. Kumar, Pune (IN)

(73) Assignee: DELL PRODUCTS L.P., Round Rock, TX (US)

(*) Notice: Subject to any disclaimer, the term of this patent is extended or adjusted under 35 U.S.C. 154(b) by 55 days.

(21) Appl. No.: 18/356,941

(22) Filed: Jul. 21, 2023

(51) Int. Cl.
  *G06F 16/10* (2019.01)
  *G06F 16/11* (2019.01)
  *G06F 16/13* (2019.01)
  *G06F 16/16* (2019.01)

(52) U.S. Cl.
  CPC ............ *G06F 16/162* (2019.01); *G06F 16/11* (2019.01); *G06F 16/13* (2019.01)

(58) Field of Classification Search
  CPC ......... G06F 16/162; G06F 16/11; G06F 16/13
  See application file for complete search history.

(56) References Cited

U.S. PATENT DOCUMENTS

| | | | |
|---|---|---|---|
| 2014/0215568 A1* | 7/2014 | Kirigin | G06F 21/6218 726/4 |
| 2018/0039654 A1* | 2/2018 | Rodrigues | H04L 67/1095 |
| 2022/0188272 A1* | 6/2022 | Kumar | G06F 16/178 |
| 2022/0210093 A1* | 6/2022 | Kumar | H04L 47/828 |

* cited by examiner

*Primary Examiner* — Kristopher Andersen
(74) *Attorney, Agent, or Firm* — Amin, Turocy & Watson, LLP

(57) ABSTRACT

A system can maintain respective extended attributes for respective files in a file system, wherein the respective extended attributes comprise respective first-in-first-out (FIFO) queues of user identities that have been determined to have modified the respective files. The system can receive an indication to perform a delete operation on a first portion of the file system, wherein the indication is indicative of a first user identity for which files are to be preserved. The system can, in response to receiving the indication, evaluate the respective files, comprising in response to determining that the first user identity is omitted from a FIFO queue of the respective FIFO queues, delete a file of the respective files that corresponds to the FIFO queue; and in response to determining that the first user identity is identified in the FIFO queue, refrain from deleting the file.

20 Claims, 11 Drawing Sheets

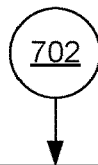
A DELETE JOB ACCEPTS A "USER" ALONG WITH A PATH 704
BEFORE DELETING A FILE, THE DELETE JOB CHECKS IF THE "USER" IS IN THE "WRITERS" EXTENDED ATTRIBUTE OF FILE F. THAT IS, AN EXTENDED ATTRIBUTE FOR THE FILE CAN BE CHECKED, AND IT IS DETERMINED WHETHER THE USER IDENTIFIED IN INVOKING THE DELETE COMMAND IS FOUND 706
IF NOT FOUND, THEN DELETE, OTHERWISE GO TO NEXT FILE 708
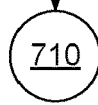
FIG. 7

800

(802)

MAINTAINING RESPECTIVE EXTENDED ATTRIBUTES FOR RESPECTIVE FILES IN A FILE SYSTEM, WHEREIN THE RESPECTIVE EXTENDED ATTRIBUTES COMPRISE RESPECTIVE FIRST-IN-FIRST-OUT (FIFO) QUEUES OF USER IDENTITIES THAT HAVE BEEN DETERMINED TO HAVE MODIFIED THE RESPECTIVE FILES 804

RECEIVING AN INDICATION TO PERFORM A DELETE OPERATION ON A FIRST PORTION OF THE FILE SYSTEM, WHEREIN THE INDICATION IS INDICATIVE OF A FIRST USER IDENTITY FOR WHICH FILES ARE TO BE PRESERVED 806

IN RESPONSE TO RECEIVING THE INDICATION, EVALUATING THE RESPECTIVE FILES, COMPRISING, IN RESPONSE TO DETERMINING THAT THE FIRST USER IDENTITY IS OMITTED FROM A FIFO QUEUE OF THE RESPECTIVE FIFO QUEUES, DELETING A FILE OF THE RESPECTIVE FILES THAT CORRESPONDS TO THE FIFO QUEUE, AND IN RESPONSE TO DETERMINING THAT THE FIRST USER IDENTITY IS IDENTIFIED IN THE FIFO QUEUE, REFRAINING FROM DELETING THE FILE 808

USER AWARE DATA DELETION JOB

BACKGROUND

Computer systems can store data, and this data can be deleted to free storage resources.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain respective extended attributes for respective files in a file system, wherein the respective extended attributes comprise respective first-in-first-out (FIFO) queues of user identities that have been determined to have modified the respective files. The system can receive an indication to perform a delete operation on a first portion of the file system, wherein the indication is indicative of a first user identity for which files are to be preserved. The system can, in response to receiving the indication, evaluate the respective files, comprising in response to determining that the first user identity is omitted from a FIFO queue of the respective FIFO queues, delete a file of the respective files that corresponds to the FIFO queue; and in response to determining that the first user identity is identified in the FIFO queue, refrain from deleting the file.

An example method can comprise receiving, by a system comprising a processor, an indication to perform a delete operation on a first path of a file system, wherein the indication comprises identity information associated with a first user identity. The method can further comprise, in response to receiving the indication, evaluating, by the system, the respective files within the first path, comprising, in response to determining that the first user identity is omitted from a first group of user identities that is associated with a file of the respective files, deleting the file; and, in response to determining that the first user identity is identified in the first group of user identities, refraining from deleting the file.

An example non-transitory computer-readable medium can comprise instructions that, in response to execution, cause a system comprising a processor to perform operations. These operations can comprise receiving a first indication to perform a delete operation on a path of a file system, wherein the first indication comprises account information indicative of a user account. These operations can further comprise, in response to receiving the first indication, in response to determining that the user account is omitted from a group of user accounts that is associated with a file of the respective, deleting the file; and, in response to determining that the user account is identified in the group of user accounts, refraining from deleting the file.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates an example process flow for deleting files based on a user, and that can facilitate user aware data deletion jobs, in accordance with an embodiment of this disclosure;

FIG. 8 illustrates an example process flow that can facilitate user aware data deletion jobs, in accordance with an embodiment of this disclosure;

DETAILED DESCRIPTION

Overview

Figure 1:
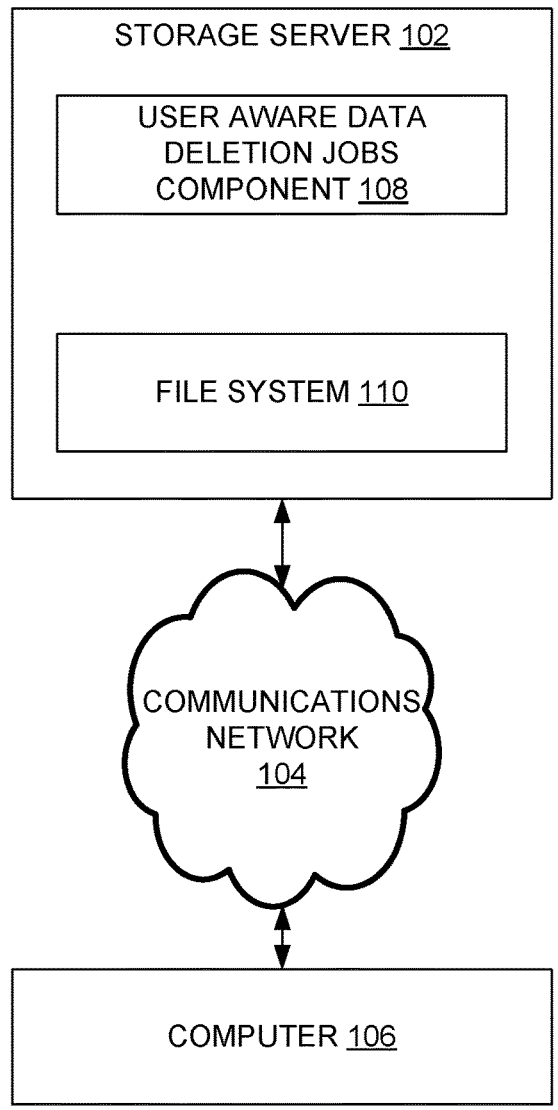
FIG. 1 illustrates an example system architecture that can facilitate user aware data deletion jobs, in accordance with an embodiment of this disclosure.

A computer storage system can provide a facility to delete unwanted and/or old files to free up storage space. In some examples, this can be facilitated with a delete job, where a job can generally comprise an instance of executing a computer program that is configured to perform a given task.

In some examples, a delete job can accept a file path within a file system, and delete all files within that file path. Take a scenario where a client has a directory in which many users and/or applications are writing. The size of that directory can grow over time. An administrator can want to reduce a storage size of the directory by deleting some (but not all) of the files within that directory. It can be that some of the files are important, while others are sufficiently unimportant (or otherwise not identified as important) that they can be deleted.

Some prior approaches permit an administrator to delete files based on their characteristics, such as access time, modified time, or file owner.

In some examples, an importance of a file can be determined based on who (e.g., which users and/or applications) has written data to the file, regardless of who is the owner of the file.

In such examples, and according to the present techniques, a delete job can include an option to delete only those files that have not been written to be a user and/or application that is deemed important.

According to the present techniques, the latest N writers of a file (e.g., a defined number of the most recent users and/or applications that have modified the file) can be identified. In an example, to do this, the following steps can be performed. A user user_id can write to a new or existing file, f. If an extended attribute "writers" for the file does not already exist, create the extended attribute "writers." This writers extended attribute can be configured to save multiple user ids (with a maximum of saving N user ids).

The user_id from the write/modify operation can be identified. The identified user_id can be appended to the writers extended attribute. If the writers extended attribute is already storing N user ids, then the oldest entry can be deleted.

According to the present techniques, deleting files based on the last N users who wrote to them can be implemented as follows. A delete job can accept an input parameter of a user along with a file path. Before deleting a file, f, the delete job can check if the user is in the writers extended attribute of file f. If the user is found in the writers extended attribute, it can be that the delete job refrains from deleting the file. And if the user is not found in the writers extended attribute, it can be that the delete job deletes the file. In this manner, an identification of users for whom files are not to be deleted can be provided to a delete job, and the delete job can skip over deleting these "important user files."

The present techniques can be applied to a variety of computer storage architectures, such as computing clusters, network-attached storage (NAS) systems, and/or storage area network (SAN) systems.

While the examples herein generally relate to users that have accessed a file, it can be appreciated that a "user identity" can include an identity of a particular application (e.g., a word processor) that has accessed a file. Additionally, while the examples herein generally relate to modifying files, it can be appreciated that the present techniques can be applied to other types of file access, such as preserving files that important users have recently read. Additionally, while the present techniques generally relate to preserving files of one important user in a delete job, it can be appreciated that the present techniques can be applied to preserving files of multiple users in a delete job. Additionally, while the present techniques generally relate to file system storage, it can be appreciated the present techniques can be applied to other types of data storage.

Example Architectures

FIG. 1 illustrates an example system architecture 100 that can facilitate user aware data deletion jobs, in accordance with an embodiment of this disclosure.

System architecture 100 comprises storage server 102, communications network 104, and computer 106. In turn, storage server 102 comprises user aware data deletion jobs component 108 and file system 110.

Figure 11:
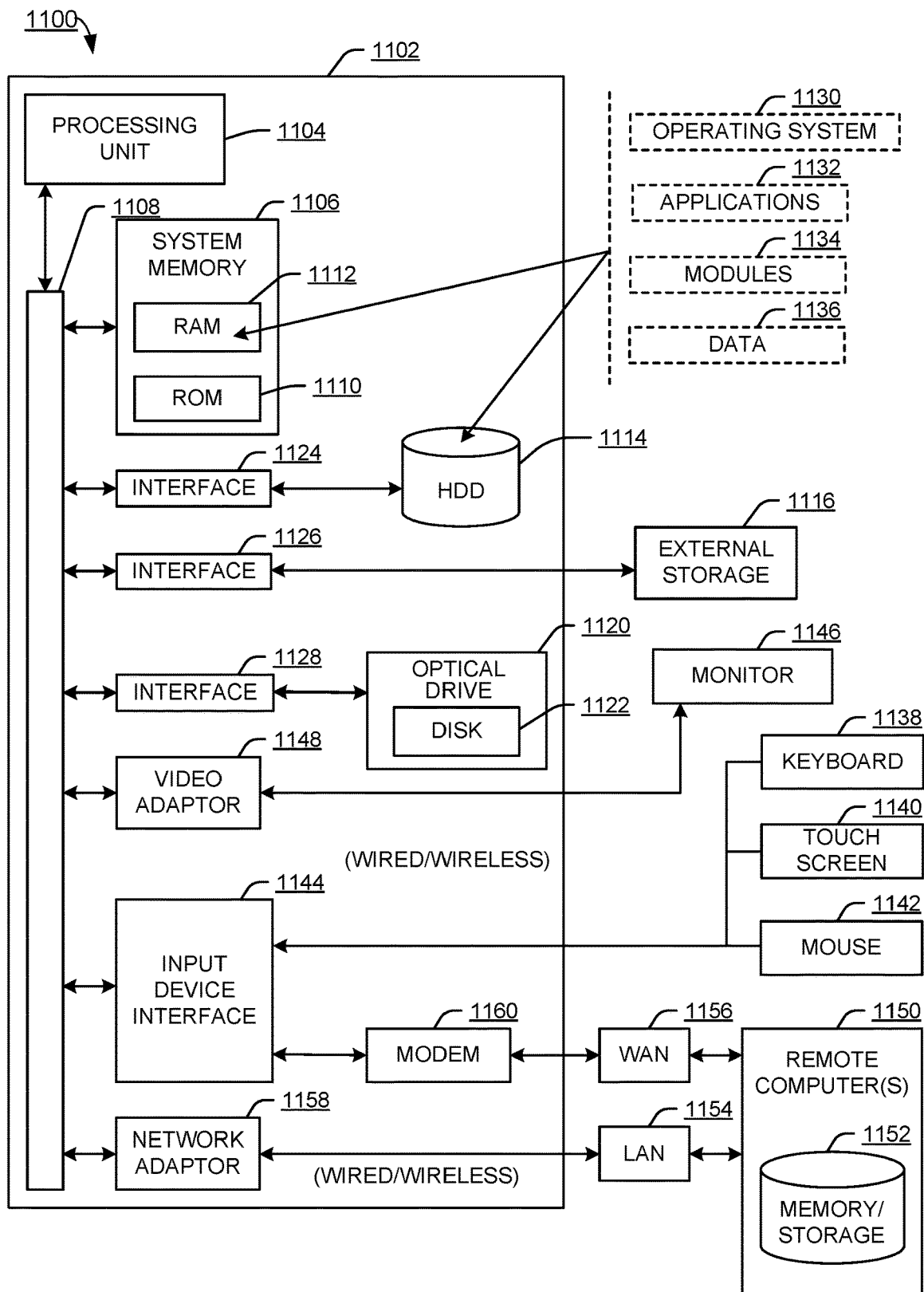
FIG. 11 illustrates an example block diagram of a computer operable to execute an embodiment of this disclosure.

Each of storage server 102 and/or computer 106 can be implemented with part(s) of computing environment 1100 of FIG. 11. Communications network 104 can comprise a computer communications network, such as the Internet.

Storage server 102 can store computer data, and can be implemented in various ways, such as a NAS system, a SAN system, and/or a computing cluster. As part of that, storage server 102 can store files in file system 110.

User accounts associated with computer 106 (or logged directly into storage server 102) can access and modify files stored in file system 110. When a delete job is invoked on file system 110 (such as to reclaim storage space), user aware data deletion jobs component 108 can evaluate files in a file system path, delete those that have not recently been modified by an important user, and preserve those that have recently been modified by an important user. In some examples, "recently" can indicate a number of users who have modified the file rather than a time period—e.g., whether an important user is one of the N most recent users to have modified the file.

Figure 9:
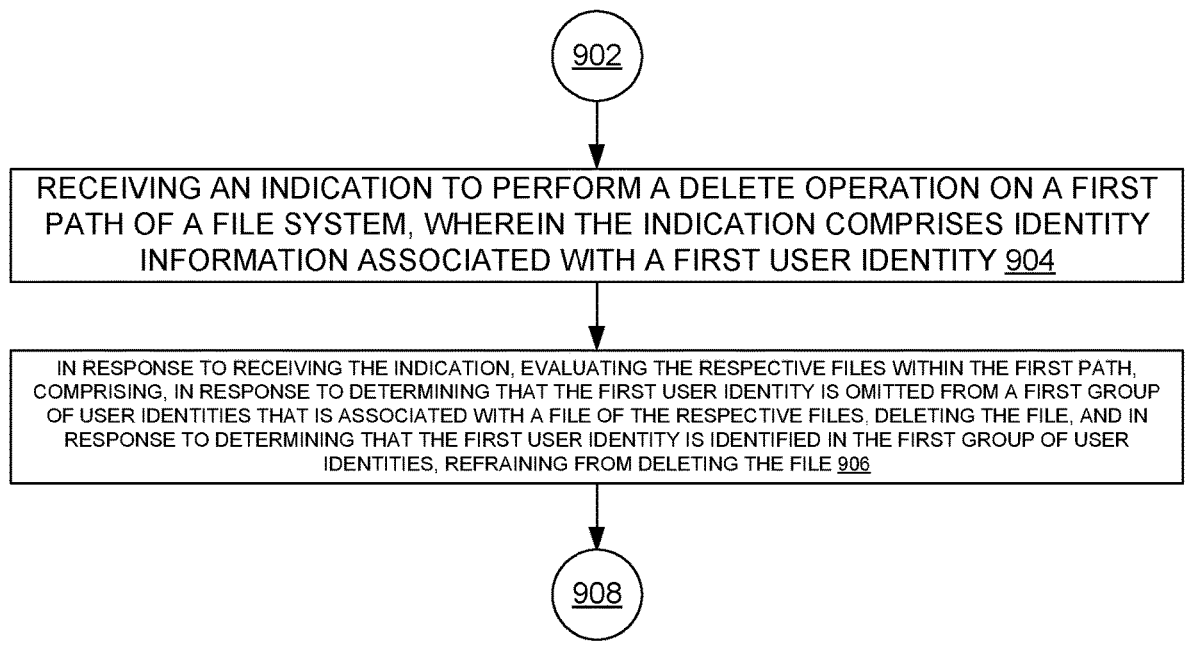
FIG. 9 illustrates an example process flow that can facilitate user aware data deletion jobs, in accordance with an embodiment of this disclosure.
Figure 10:
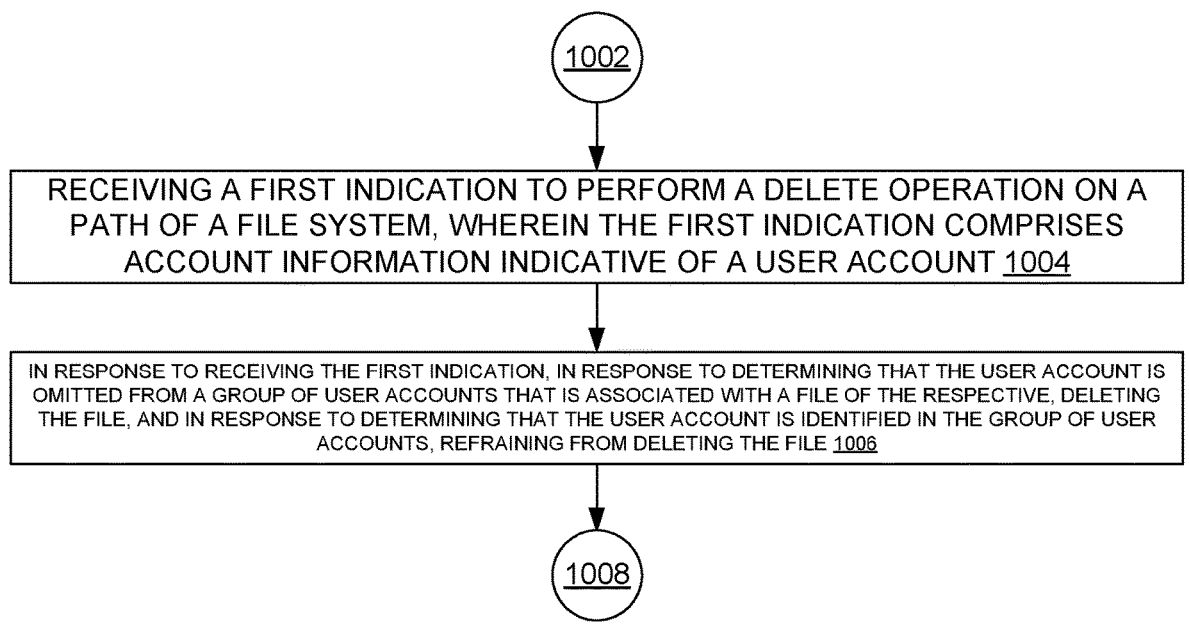
FIG. 10 illustrates an example process flow that can facilitate user aware data deletion jobs, in accordance with an embodiment of this disclosure.

In some examples, user aware data deletion jobs component 108 can implement part(s) of the process flows of FIGS. 8-10 to implement user aware data deletion jobs.

It can be appreciated that system architecture 100 is one example system architecture for user aware data deletion jobs, and that there can be other system architectures that facilitate user aware data deletion jobs.

Figure 2:
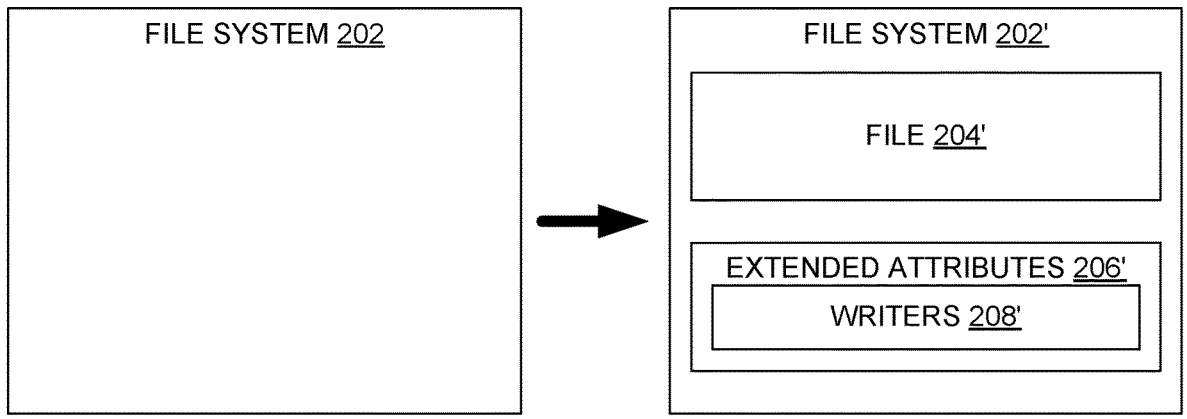
FIG. 2 illustrates an example system architecture for creating an extended attribute, and that can facilitate user aware data deletion jobs, in accordance with an embodiment of this disclosure.

FIG. 2 illustrates an example system architecture 200 for creating an extended attribute, and that can facilitate user aware data deletion jobs, in accordance with an embodiment of this disclosure. In some examples, part(s) of system architecture 200 can be used to implement part(s) of system architecture 100 of FIG. 1 to facilitate user aware data deletion jobs.

System architecture 200 comprises file system 202 (which can be similar to file system 110 of FIG. 1 at one point in time), file system 202' (which can be similar to file system 110 at another point in time), file 204', extended attributes 206', writers 208', and user aware data deletion jobs component 210 (which can be similar to user aware data deletion jobs component 108).

File system 202' generally comprises a state of file system 202 after file 204' has been created. It can be appreciated that, in some examples, similar techniques as described with respect to FIG. 2 can be applied to creating an extended attribute in a pre-existing file that lacks a writers extended attribute.

Figure 3:
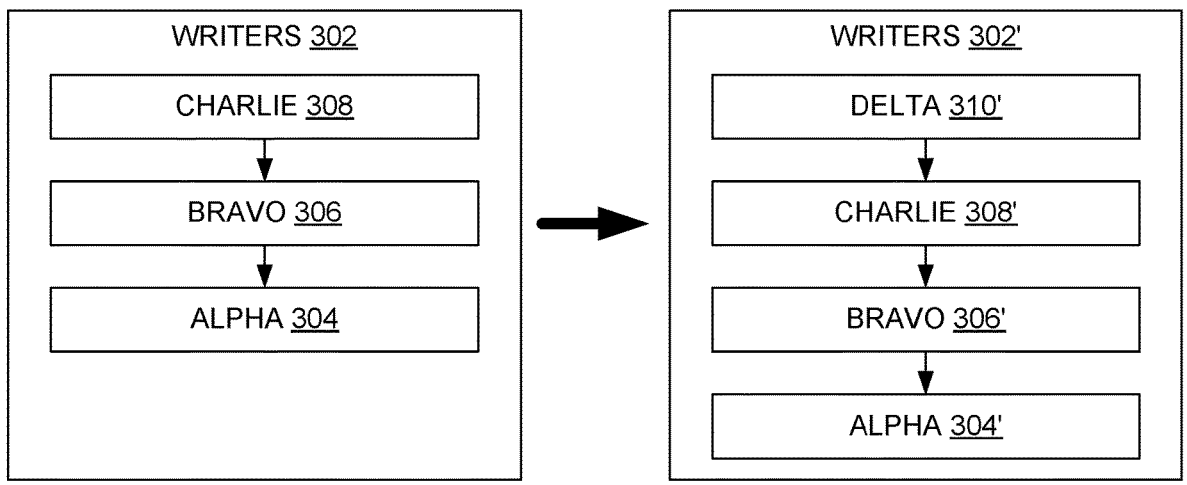
FIG. 3 illustrates an example system architecture for adding a user identity to an existing extended attribute, and that can facilitate user aware data deletion jobs, in accordance with an embodiment of this disclosure.

FIG. 3 illustrates an example system architecture 300 for adding a user identity to an existing extended attribute, and that can facilitate user aware data deletion jobs, in accordance with an embodiment of this disclosure. In some examples, part(s) of system architecture 300 can be used to implement part(s) of system architecture 100 of FIG. 1 to facilitate user aware data deletion jobs.

System architecture 300 comprises extended attribute writers 302, user alpha 304, user bravo 306, user charlie 308, extended attribute writers 302', user alpha 304', user bravo 306', user charlie 308', user delta 310', and user aware data deletion jobs component 312 (which can be similar to user aware data deletion jobs component 108 of FIG. 1).

Extended attribute writers 302' generally comprises a state of extended attribute writers 302 after user delta 310' has written to a file that corresponds to extended attribute writers 302'. Here, user delta 310' is now identified in extended attribute writers 302', and at a "first in" position as part of maintaining extended attribute writers 302' as a FIFO queue.

Figure 4:
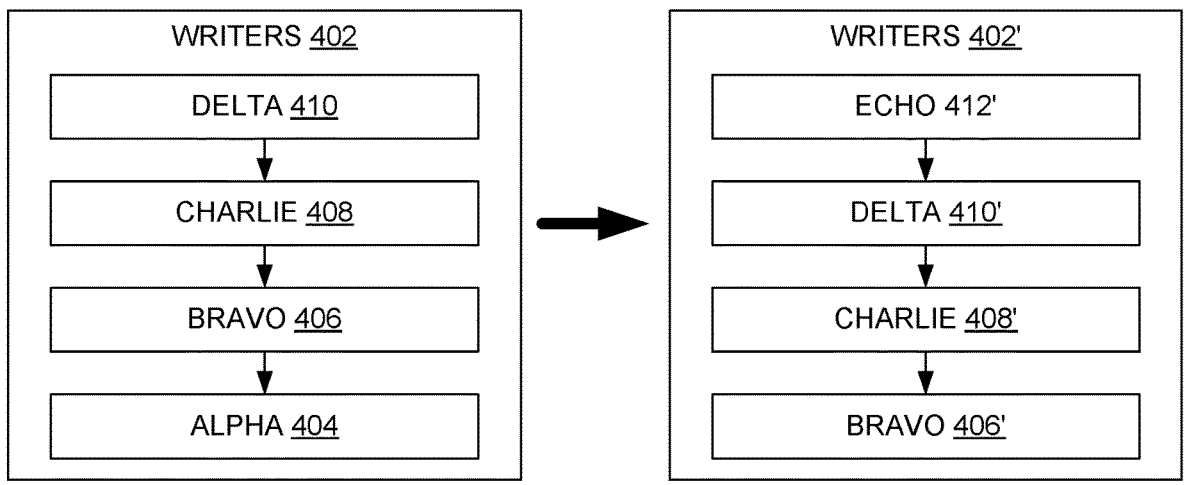
FIG. 4 illustrates an example system architecture for adding a user identity to an existing extended attribute that is full, and that can facilitate user aware data deletion jobs, in accordance with an embodiment of this disclosure.

FIG. 4 illustrates an example system architecture 400 for adding a user identity to an existing extended attribute that is full, and that can facilitate user aware data deletion jobs, in accordance with an embodiment of this disclosure. In some examples, part(s) of system architecture 400 can be used to implement part(s) of system architecture 100 of FIG. 1 to facilitate user aware data deletion jobs.

System architecture 400 comprises extended attribute writers 402, user alpha 404, user bravo 406, user charlie 408, user delta 410, extended attribute writers 402', user bravo 406', user charlie 408', user delta 410', user echo 412', and user aware data deletion jobs component 414 (which can be similar to user aware data deletion jobs component 108 of FIG. 1).

Extended attribute writers 402' generally comprises a state of extended attribute writers 402 after user delta 410' has written to a file that corresponds to extended attribute writers 402'. A writers extended attribute can have a maximum size (in this example, the maximum size is four writers), and can be maintained as a first-in-first-out queue such that, when a maximum size is reached and a new user is added, an oldest identified user will be removed.

In contrast to FIG. 3, where the extended attribute writers 302 stores 3 elements so the extended attribute writers 302 is not at the maximum size of 4, here, the extended attribute writers 402 does store the maximum of 4 elements. So, as part of adding user echo 412' to extended attribute writers 402', the oldest-added user—user alpha 404—is removed from the extended attribute.

Figure 5:
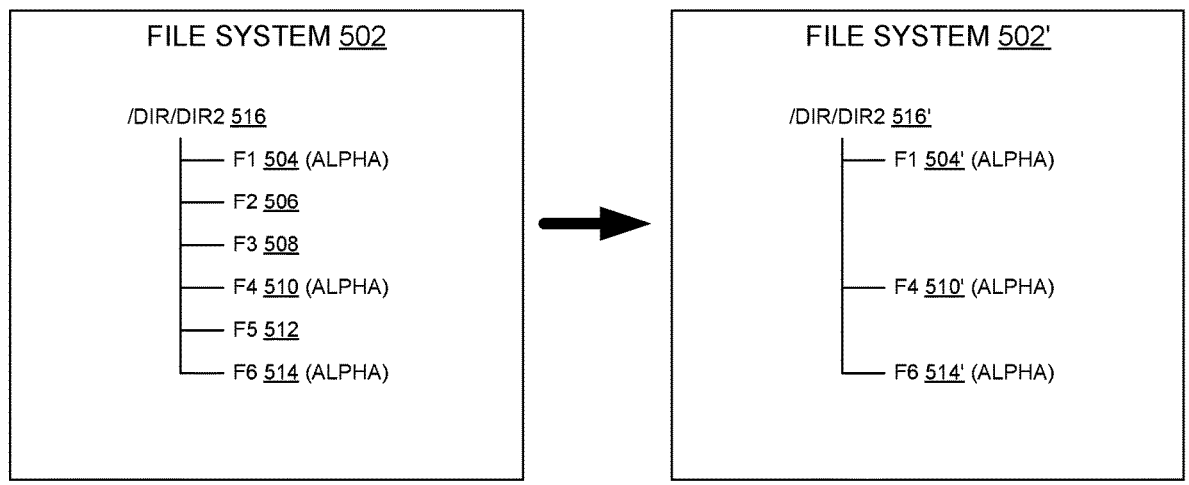
FIG. 5 illustrates another example system architecture that can facilitate user aware data deletion jobs, in accordance with an embodiment of this disclosure.

FIG. 5 illustrates another example system architecture 500 that can facilitate user aware data deletion jobs, in accordance with an embodiment of this disclosure. In some examples, part(s) of system architecture 500 can be used to implement part(s) of system architecture 100 of FIG. 1 to facilitate user aware data deletion jobs.

System architecture 500 comprises file system 502, file F1 504, file F2 506, file F3 508, file F4 510, file F5 512, file F6 514, directory/dir/dir2 516, file system 502', file F1 504', file F4 510', file F6 514', directory/dir/dir2 516' and user aware data deletion jobs component 518 (which can be similar to user aware data deletion jobs component 108 of FIG. 1).

File system 502' generally comprises a state of file system 502 after user aware data deletion jobs component 518 has performed a delete job. This delete job can be invoked as "delete -user alpha -dir/dir/dir2" and can indicate that the delete job is to be performed on a portion of a file system within a file path of "/dir/dir2" and that any files that user alpha has recently written to should not be deleted. As indicated in FIG. 5, file F1 504, file F4 510, and file F6 514 have recently been written to by user alpha, as indicated in their respective extended attribute writers.

A result of user aware data deletion jobs component 518 performing the delete job is that file F2 506, file F3 508, and file F5 512 are deleted; and file F1 504', file F4 510', and file F6 514' are preserved in file system 502'. It can be that there are files that are in file system 502 but outside directory/dir/dir2 516 that user alpha has not recently written to (or has recently written to), and these files can also be preserved.

Example Process Flows

Figure 6:
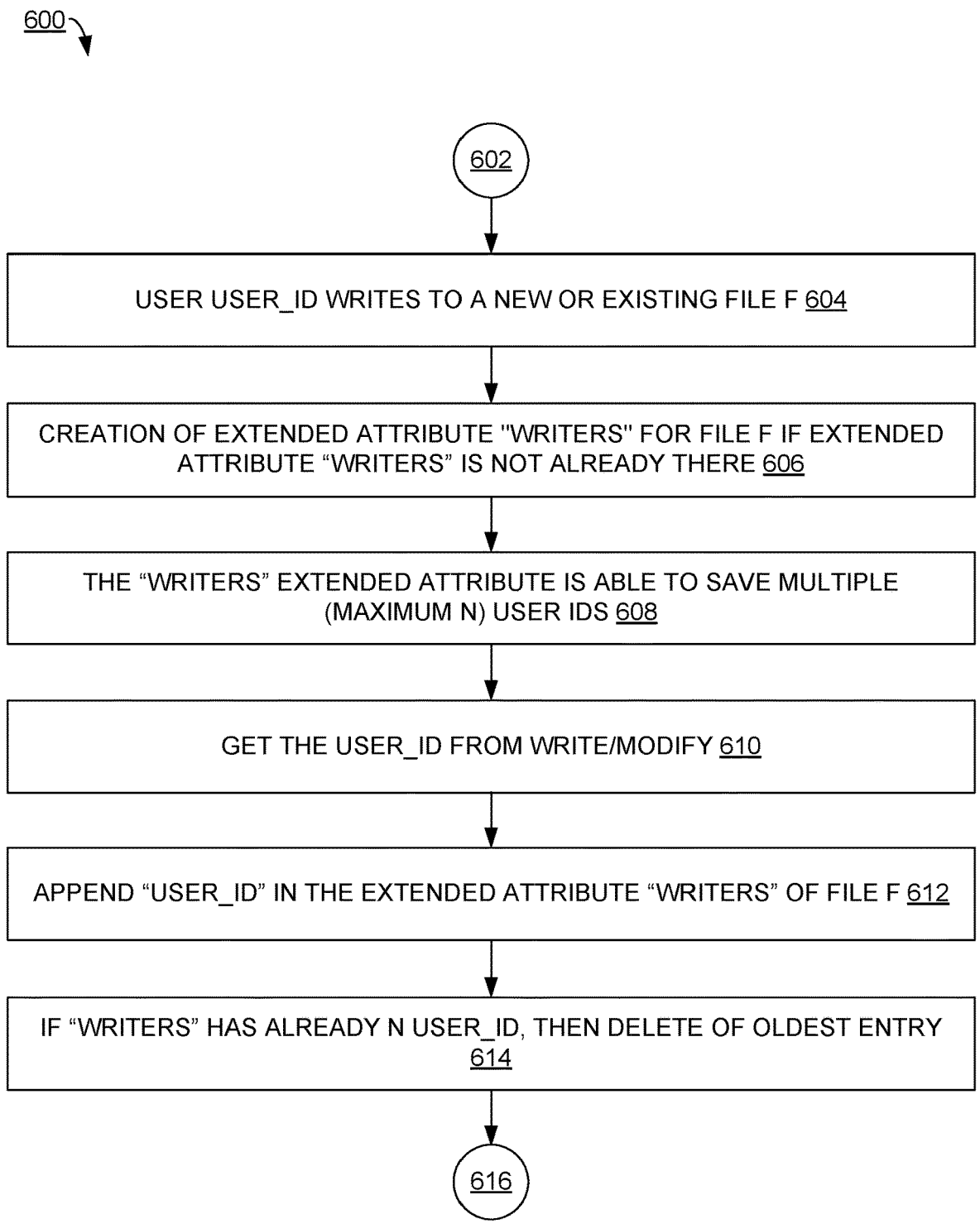
FIG. 6 illustrates an example process flow for storing the latest N writers to a file, and that can facilitate user aware data deletion jobs, in accordance with an embodiment of this disclosure.

FIG. 6 illustrates an example process flow 600 for storing the latest N writers to a file, and that can facilitate user aware data deletion jobs, in accordance with an embodiment of this disclosure. In some examples, one or more embodiments of process flow 600 can be implemented by user aware data deletion jobs component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts user user_id writes to a new or existing file f. That is, a file system operation can be performed where a user account (user_id, which can be associated with computer 106 of FIG. 1) requests a file system operation to be performed to modify a file (e.g., a file of file system 110).

After operation 604, process flow 600 moves to operation 606.

Operation 606 depicts creation of extended attribute "writers" for file f if the extended attribute "writers" is not already there. This can be performed in a similar manner as depicted with respect to FIG. 2.

After operation 606, process flow 600 moves to operation 608.

Operation 608 depicts the "writers" extended attribute is able to save multiple (maximum N) user ids. This can be similar to the example of an extended attribute in FIG. 4.

After operation 608, process flow 600 moves to operation 610.

Operation 610 depicts get the user_id from write/modify. That is, a write/modify operation can identify the user_id that invoked the write/modify operation.

After operation 610, process flow 600 moves to operation 612.

Operation 612 depicts append "user_id" in the extended attribute "writers" of file f. That is, a name of the user_id can be saved to the extended attribute writers, such as in the example of FIG. 3.

After operation 612, process flow 600 moves to operation 614.

Operation 614 depicts, if "writers" has already N user_id, then delete of oldest entry. This can be performed in a similar manner as the example of FIG. 4.

After operation 614, process flow 600 moves to 616, where process flow 600 ends.

FIG. 7 illustrates an example process flow 700 for deleting files based on a user, and that can facilitate user aware data deletion jobs, in accordance with an embodiment of this disclosure. In some examples, one or more embodiments of process flow 700 can be implemented by user aware data deletion jobs component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts a delete job accepts a "user" along with a path. This can be similar to the example of FIG. 5, where an example delete job is invoked with the command "delete -user alpha -dir/dir/dir2".

After operation 704, process flow 700 moves to operation 706.

Operation 706 depicts, before deleting a file, the delete job checks if the "user" is in the "writers" extended attribute of file f That is, an extended attribute for the file can be checked, and it is determined whether the user identified in invoking the delete command is found. Using the example of FIG. 3, if the delete command comprises "-user alpha" and the writers extended attribute is writers 302', then "alpha" can be found (as alpha 304').

After operation 706, process flow 700 moves to operation 708.

Operation 708 depicts, if not found, then delete, otherwise go to next file. That is, where the user is found in operation 706, the file is not deleted (e.g., because the user has been deemed to be an important user, for whom files should be preserved). And if the user is not found, then the file is deleted (e.g., because the file has not been recently modified by a user deemed to be an important user).

After operation 708, process flow 700 moves to 710, where process flow 700 ends.

FIG. 8 illustrates an example process flow 800 that can facilitate user aware data deletion jobs, in accordance with an embodiment of this disclosure. In some examples, one or more embodiments of process flow 800 can be implemented by user aware data deletion jobs component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts maintaining respective extended attributes for respective files in a file system, wherein the respective extended attributes comprise respective first-in-first-out (FIFO) queues of user identities that have been determined to have modified the respective files. In some examples, this can comprise maintaining a writers extended attribute (which can be similar to extended attribute writers 302 of FIG. 3) in a file system (which can be similar to file system 110 of FIG. 1).

After operation 804, process flow 800 moves to operation 806.

Operation 806 depicts receiving an indication to perform a delete operation on a first portion of the file system, wherein the indication is indicative of a first user identity for which files are to be preserved. In some examples, this can be similar to the delete job of FIG. 5 ("delete -user alpha -dir/dir/dir2"), where the indication of the first user identity for which files are to be preserved is "-user alpha," with "-user" indicating that the next part of the command is a user identity and "alpha" being the first user identity.

In some examples, the first portion of the file system comprises a file system path, and wherein the indication to perform the delete operation is further indicative of the file system path. Using the example of the delete job of FIG. 5, this can comprise "-dir/dir/dir2" where "-dir" indicating that the next part of the command is a file system path, and "/dir/dir2" being that file system path.

After operation 806, process flow 800 moves to operation 808.

Operation 808 depicts, in response to receiving the indication, evaluating the respective files, comprising, in response to determining that the first user identity is omitted from a FIFO queue of the respective FIFO queues, deleting a file of the respective files that corresponds to the FIFO queue, and in response to determining that the first user identity is identified in the FIFO queue, refraining from deleting the file. That is, for each file analyzed by the delete job of operation 808, a file can be deleted where the user "alpha" is not found in the corresponding writers extended attribute, and the file can be preserved where the user "alpha" is found in the corresponding writers extended attribute.

In some examples, the indication to perform the delete operation is a first indication. In such examples, operation 808 can comprise, in response to receiving a second indication to perform the delete operation, deleting files of the file system independently of user identities identified in FIFO queues of the respective FIFO queues, wherein the second indication omits a user identity indication. That is, if a delete job is invoked without a user parameter, the delete job can function by deleting all files in the identified file system path, without regards to which users have recently modified the file.

In some examples, the file corresponds to a group of extended attributes, a first extended attribute of the group of extended attributes comprises the FIFO queue, and the delete operation is performed independently of contents of a second extended attribute of the group of extended attributes. That is, a file can have multiple extended attributes, and of those extended attributes, it can be the writers extended attribute that is used for user aware data deletion jobs.

In some examples, operation 808 comprises creating the FIFO queue in response to creating the file. This can occur as part of operation 804. When a file is created, a corresponding writers extended attribute can also be created. In some examples, operation 808 comprises storing an indication of a creating user identity that is associated with the creating of the file, wherein the creating user identity comprises the first user identity or a second user identity. That is, the user who creates the file can be stored in the corresponding writers extended attribute.

In some examples, operation 808 comprises creating the FIFO queue in response to writing to the file, and in response to determining that the FIFO queue does not already exist. That is, it can be that some files have been created without creating a corresponding writers extended attribute (or that extended attribute has been deleted). When such a file is encountered and modified, the writers extended attribute can be created. In some examples, operation 808 comprises storing an indication of a writing user identity that is associated with the writing to the file, wherein the writing user identity comprises the first user identity or a second user identity. That is, the user who writes to the file can be stored in the corresponding writers extended attribute.

After operation 808, process flow 800 moves to 810, where process flow 800 ends.

FIG. 9 illustrates an example process flow 900 that can facilitate user aware data deletion jobs, in accordance with an embodiment of this disclosure. In some examples, one or more embodiments of process flow 900 can be implemented by user aware data deletion jobs component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts receiving an indication to perform a delete operation on a first path of a file system, wherein the indication comprises identity information associated with a first user identity. In some examples, operation 904 can be implemented in a similar manner as operations 804-806 of FIG. 8.

After operation 904, process flow 900 moves to operation 906.

Operation 906 depicts, in response to receiving the indication, evaluating the respective files within the first path, comprising, in response to determining that the first user identity is omitted from a first group of user identities that is associated with a file of the respective files, deleting the file, and in response to determining that the first user identity is identified in the first group of user identities, refraining from deleting the file. In some examples, operation 906 can be implemented in a similar manner as operation 808 of FIG. 8.

In some examples, operation 906 comprises maintaining the first group of user identities as a first-in-first-out queue. That is, the first group of user identities can be maintained as a writers extended attribute that uses a FIFO queue data structure.

In some examples, the first-in-first-out queue comprises a maximum number of user identities, and operation 906 can comprise in response to determining to add a new user identity to the first-in-first-out queue, wherein the new user identity comprises the first user identity or a second user identity, and in response to determining that the first-in-first-out queue is storing the maximum number of user identities, removing an existing user identity from the first-in-first-out queue as part of adding the new user identity to the first-in-first-out queue. That is, when the FIFO queue is full and a user identity is added to the FIFO queue, an oldest entry of the FIFO queue can be removed.

In some examples, the first-in-first-out queue comprises a maximum number of user identities, and operation 906 can comprise in response to determining to add a user identity to the first-in-first-out queue, wherein the user identity comprises the first user identity or a second user identity, and in response to determining that the first-in-first-out queue already identifies the user identity, moving an identification of the user identity to a most-recent-user-identity position of the first-in-first-out queue. That is, when the FIFO queue is full, and the current writing user is already identified in the queue, instead of deleting the oldest user, the current writing user can be moved to a "newest" user position in the FIFO queue.

In some examples, a first extended attribute that is associated with the file comprises the first group of user identities, the first extended attribute has a name, and the delete operation accesses the first extended attribute based on the name. That is, a delete job can access the writers extended attribute where that extended attribute has a known name for each file.

In some examples, respective user identities of the first group of user identities have been determined to have created, or written to, the file. That is, user identities can be stored in a writers extended attribute because they have modified the file.

After operation 906, process flow 900 moves to 908, where process flow 900 ends.

FIG. 10 illustrates an example process flow 1000 that can facilitate user aware data deletion jobs, in accordance with an embodiment of this disclosure. In some examples, one or more embodiments of process flow 1000 can be implemented by user aware data deletion jobs component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts receiving a first indication to perform a delete operation on a path of a file system, wherein the first indication comprises account information indicative of a user account.

After operation 1004, process flow 1000 moves to operation 1006.

Operation 1006 depicts, in response to receiving the first indication, in response to determining that the user account is omitted from a group of user accounts that is associated with a file of the respective, deleting the file, and in response to determining that the user account is identified in the group of user accounts, refraining from deleting the file.

In some examples, operation 1006 comprises maintaining the group of user accounts as a first-in-first-out queue.

In some examples, operation 1006 comprises, in response to receiving a second indication to perform the delete operation, deleting files of the file system independently of user accounts identified in groups of user accounts, wherein the groups of user accounts comprise the group of user accounts, and wherein the second indication omits a user account indication.

In some examples, the file corresponds to a group of extended attributes, a first extended attribute of the group of extended attributes comprises the group of user accounts, and the delete operation is performed independently of contents of a second extended attribute of the group of extended attributes.

In some examples, operation 1006 comprises creating the group of user accounts in response to creating the file.

In some examples, operation 1006 comprises, in response to determining that the group of user accounts does not exist, creating the group of user accounts in response to writing to the file.

After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of storage server 102, and/or computer 106 of FIG. 1.

In some examples, computing environment 1100 can implement one or more embodiments of the process flows of FIGS. 8-10 to facilitate user aware data deletion jobs.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory that stores executable instructions that, when executed by the at least one processor, facilitate performance of operations, comprising:
maintaining respective extended attributes for respective files in a file system, wherein the respective extended attributes comprise respective first-in-first-out (FIFO) queues of user identities that have been determined to have modified the respective files;
receiving an indication to perform a delete operation on a first portion of the file system, wherein the indication is indicative of a first user identity for which files are to be preserved;
in response to receiving the indication, evaluating the respective files, comprising:
in response to determining that the first user identity is omitted from a FIFO queue of the respective FIFO queues, deleting a file of the respective files that corresponds to the FIFO queue; and
in response to determining that the first user identity is identified in the FIFO queue, refraining from deleting the file.

2. The system of claim 1, wherein the first portion of the file system comprises a file system path, and wherein the indication to perform the delete operation is further indicative of the file system path.

3. The system of claim 1, wherein the indication to perform the delete operation is a first indication, and wherein the operations further comprise:
in response to receiving a second indication to perform the delete operation, deleting files of the file system independently of user identities identified in FIFO queues of the respective FIFO queues, wherein the second indication omits a user identity indication.

4. The system of claim 1, wherein the file corresponds to a group of extended attributes, wherein a first extended attribute of the group of extended attributes comprises the FIFO queue, and wherein the delete operation is performed independently of contents of a second extended attribute of the group of extended attributes.

5. The system of claim 1, wherein the operations further comprise:
creating the FIFO queue in response to creating the file.

6. The system of claim 5, wherein the operations further comprise:
storing an indication of a creating user identity that is associated with the creating of the file, wherein the creating user identity comprises the first user identity or a second user identity.

7. The system of claim 1, wherein the operations further comprise:
creating the FIFO queue in response to writing to the file, and in response to determining that the FIFO queue does not already exist.

8. The system of claim 7, wherein the operations further comprise:
storing an indication of a writing user identity that is associated with the writing to the file, wherein the writing user identity comprises the first user identity or a second user identity.

9. A method, comprising:
maintaining, by a system comprising at least one processor, respective extended attributes for respective files in a file system, wherein the respective extended attributes comprise respective first-in-first-out queues of user identities that have been determined to have modified the respective files;
receiving, by the system, an indication to perform a delete operation on a first path of a file system, wherein the indication comprises identity information associated with a first user identity; and
in response to receiving the indication, evaluating, by the system, the respective files within the first path, comprising:
in response to determining that the first user identity is omitted from a first-in-first-out queue of the respective first-in-first-out queues that is associated with a file of the respective files, deleting the file; and
in response to determining that the first user identity is identified in the first-in-first-out queue, refraining from deleting the file.

10. The method of claim 9, wherein the first-in-first-out queue comprises a maximum number of user identities, and further comprising:
in response to determining to add a new user identity to the first-in-first-out queue, wherein the new user identity comprises the first user identity or a second user identity, and in response to determining that the first-in-first-out queue is storing the maximum number of user identities, removing an existing user identity from the first-in-first-out queue as part of adding the new user identity to the first-in-first-out queue.

11. The method of claim 9, wherein the first-in-first-out queue comprises a maximum number of user identities, and further comprising:
in response to determining to add a user identity to the first-in-first-out queue, wherein the user identity comprises the first user identity or a second user identity, and in response to determining that the first-in-first-out queue already identifies the user identity, moving an identification of the user identity to a most-recent-user-identity position of the first-in-first-out queue.

12. The method of claim 9, wherein a first extended attribute that is associated with the file comprises the first-in-first-out queue, wherein the first extended attribute has a name, and wherein the delete operation accesses the first extended attribute based on the name.

13. The method of claim 9, wherein respective user identities of the first-in-first-out queue have been determined to have created or written to the file.

14. The method of claim 9, wherein the indication to perform the delete operation is a first indication, and further comprising:
in response to receiving a second indication to perform the delete operation, deleting, by the system, files of the file system independently of user identities identified in first-in-first-out queues of the respective first-in-first-out queues, wherein the second indication omits a user identity indication.

15. The method of claim 9, wherein the file corresponds to a group of extended attributes, wherein a first extended attribute of the group of extended attributes comprises the first-in-first-out queue, and wherein the delete operation is performed independently of contents of a second extended attribute of the group of extended attributes.

16. A non-transitory computer-readable medium comprising instructions that, in response to execution, cause a system comprising at least one processor to perform operations, comprising:
maintaining respective extended attributes for respective files in a file system, wherein the respective extended attributes comprise respective first-in-first-out queues of user identities that have been determined to have modified the respective files;

receiving a first indication to perform a delete operation on a path of a file system, wherein the first indication comprises account information indicative of a user account; and in response to receiving the first indication, evaluating the respective files within the first path, comprising:
- in response to determining that the user account is omitted from a first-in-first-out queue of the respective first-in-first-out queues that is associated with a file of the respective files, deleting the file; and
- in response to determining that the user account is identified in the first-in-first-out queue, refraining from deleting the file.

17. The non-transitory computer-readable medium of claim 16, wherein the operations further comprise:
in response to receiving a second indication to perform the delete operation, deleting files of the file system independently of user accounts identified in the respective first-in-first-out queues, and wherein the second indication omits a user account indication.

18. The non-transitory computer-readable medium of claim 16, wherein the file corresponds to a group of extended attributes, wherein a first extended attribute of the group of extended attributes comprises the group of user accounts, and wherein the delete operation is performed independently of contents of a second extended attribute of the group of extended attributes.

19. The non-transitory computer-readable medium of claim 16, wherein the operations further comprise:
creating the first-in-first-out queue in response to creating the file.

20. The non-transitory computer-readable medium of claim 16, wherein the operations further comprise:
in response to determining that the first-in-first-out queue does not exist, creating the first-in-first-out queue in response to writing to the file.

* * * * *